UNITED STATES PATENT OFFICE.

EBEN C. QUINBY, OF ST. LOUIS, MISSOURI, AND ENOCH BALDWIN, OF STOURPORT, ENGLAND.

IMPROVEMENT IN MANUFACTURE OF ENAMELED CAST-IRON WARE.

Specification forming part of Letters Patent No. 222,422, dated December 9, 1879; application filed June 7, 1879.

*To all whom it may concern:*

Be it known that we, EBEN COLBY QUINBY, of St. Louis, Missouri, now residing at Stourport, England, and ENOCH BALDWIN, of Stourport aforesaid, have invented certain new and useful Improvements in the Manufacture of Enameled Cast-Iron Ware, of which the following is a specification.

Our said invention relates to the enameling of cast-iron by an improved process whereby we can apply to the interior or other surface of cast-iron vessels or utensils a thin enamel coating or lining which will be stronger and more durable or permanent and cheaper than the coating or lining produced on cast-iron by any process heretofore known.

We are aware that the lining or coating of cast-iron with a kind of enamel or porcelain has already been practiced; therefore our invention does not consist in the combination of such a coating or lining with cast-iron, irrespective of the peculiar ingredients employed to form the coating or covering; but the said invention consists in the enameling of cast-iron by the peculiar process and composition whereby we effect results which have not heretofore been practicable.

Furthermore, we are aware that various compositions have been employed with more or less success for the enameling of wrought-iron, but these generally will not succeed well with cast-iron applied in a wet state.

After many experiments wherein we have ascertained the different effects produced by the use of different substances or ingredients and proportions on wrought and cast iron, we have discovered the necessary ingredients and the proportions in which they should be combined to insure success in the enameling of cast-iron, and enable us to produce enameled cast-iron ware in a commercially - advantageous manner, and we employ for this purpose a peculiar boro-silicate enamel or glass—that is to say, a composition of borax and silica, which we will hereinafter describe.

In practicing our invention it is indispensable that the surface to be enameled or glazed should be cleaned; therefore, after having first annealed the article or vessel, we turn the surface thereof in a lathe in the same manner as such articles are turned for tinning—that is to say, we find the operation of turning affords the most advantageous method of obtaining the desired cleanliness of the surface to be enameled, but if necessary or desirable we may cleanse the same by other means, such as pickling and scouring. After being turned the ware should be well washed, preferably in warm water, and wiped dry. It is then ready for the application of the enamel or glass coating.

Our improved composition or enamel is composed of equal parts of refined borax and silica, the latter, preferably, in a coarse-grained condition. After the fusion of these materials, which must be very carefully effected to insure their thorough and perfect combination, we pour or run the composition into cold water. The glass or vitreous substance thus produced is then ground in an ordinary porcelain-mill or other suitable apparatus, in water, and during this operation we add about ten (10) pounds of white clay or kaolin to every one hundred (100) pounds of the glass. After this mixture or compound has been ground sufficiently fine, which will ordinarily be effected in about ten hours, it is drawn off, passed through a fine sieve, and allowed to settle for about ten or twelve hours, and the surplus water is then removed from the top. The said compound or composition at this stage of the process will be thin and watery, but by the addition of a small quantity of calcined and ground magnesia it is rendered so thick that it will not run freely. It will then be ready for application to the surface to be coated. We prefer, however, to use for thickening, the compound sulphate of magnesia, as this substance facilitates the formation of spots in the enamel or glaze when it is applied to the cast-iron; and it is a peculiar feature of our invention that, although previously any spotting or mottling has been considered detrimental to the cast-iron ware, we now produce the spotting or mottling of the enamel as a special result or effect for ornamenting our improved ware, and we take advantage of the peculiar property or nature whereby it appears that our boro-silicic composition acts on the surface of clean cast-iron when the wet glaze or enamel is dried very slowly thereon to effect the formation of the spots—that is to say, to insure the desired spotting or mottling of the ware we apply, after first cleansing the surface of the cast-iron, the aforesaid glaze or enamel to the said surface, and then allow the same to dry very slowly.

We make the same ornamental by tinting or coloring the glaze with such well-known ingredients as oxide of tin, bone-ash, or phosphate of lime, fluor-spar, magnesia, oxide of cobalt, oxide of manganese, oxide of iron, baryta, sulphate of lime, or plaster-of-paris, and other suitable substances. The oxides of lead, antimony, and arsenic might also serve, but we do not consider them safe to use for culinary purposes. The use and choice of these coloring-matters must be left to the judgment of the manufacturer, who, knowing the result he wishes to produce, can vary his composition accordingly.

It is obviousy impracticable to give herein the precise ingredients for all circumstances or cases, but it is necessary to state that when oxide of tin, or other ingredients which are not of themselves fluxes or will not act as fluxes, are used, a small portion (ordinarily not exceeding twenty pounds) of the best quality of carbonate of soda, must be added to each one hundred pounds of borax and silica. Care must be taken, however, not to use too large a quantity of this substance, otherwise few spots will appear, and the enamel will be apt to exfoliate under the effects of atmospheric changes, and become useless.

If we wish to avoid the formation of spots on the enameled surface, we apply the enamel in a very thin coat, and dry the same quickly, thereby not allowing time for the oxidation of the iron surface. The slow drying allows the application of a thicker or more perfect coat, as it permits the enamel to "set" or enter the pores of the iron.

The said enamel or glaze is applied to the iron surface of any vessel or utensil to be coated or lined, by pouring a small quantity of the liquid enamel into the said vessel or utensil, and turning the same around to cause the enamel to cover all parts of the surface thereof, then pouring out the surplus enamel; or the said enamel may be applied by dipping or immersing the vessel or utensil in it, or by other suitable means. After the coating has been applied to it the vessel is dried slowly and then burned or fused in an ordinary muffle at a cherry-red heat, or slightly below a white heat.

Having thus fully described our said invention and the manner of performing the same, we wish it clearly understood that our invention is distinguished, broadly, from any process in which the production or formation of a few spots on the surface of the enamel coating may take place accidentally, or undesignedly, or occasionally; for, as above stated, in our improved manufacture we desire and insure the production of spots or mottling on cast-iron ware as an ornamental feature, and because, by our process, this appearance can be produced with a thinner coat of enamel than any previously introduced.

We do not claim as our invention the method of enameling the surface of iron-ware by applying the composition to the cleaned surface, oxidizing the base by drying, so as to develop mottles, and then firing, so as to fix a thin coating; but What we do claim is—

The improved manufacture of enameled cast-iron (more or less mottled or spotted, as desired) by the application to the clean surface of the cast-iron of the above-described composition or glass, consisting of borax and silica in equal or about equal proportions, and more or less of the other above-named ingredients, as above set forth.

EBEN COLBY QUINBY.
ENOCH BALDWIN.

Witnesses:
JOHN HARRIS,
W. J. SUTTON.